United States Patent
Stolt et al.

(10) Patent No.: US 8,902,725 B2
(45) Date of Patent: Dec. 2, 2014

(54) ADAPTIVE MODULATION SCHEME FOR MULTIPATH WIRELESS CHANNELS

(75) Inventors: Tomas Stolt, Stockholm (SE); Bo Hedberg, Kista (SE)

(73) Assignee: Unwired Planet, LLC, Reno, NV (US)

( * ) Notice: Subject to any disclaimer, the term of this patent is extended or adjusted under 35 U.S.C. 154(b) by 672 days.

(21) Appl. No.: 12/667,341

(22) PCT Filed: Jul. 2, 2007

(86) PCT No.: PCT/SE2007/050487
§ 371 (c)(1),
(2), (4) Date: Dec. 30, 2009

(87) PCT Pub. No.: WO2009/005427
PCT Pub. Date: Jan. 8, 2009

(65) Prior Publication Data
US 2010/0208602 A1    Aug. 19, 2010

(51) Int. Cl.
H04L 27/00 (2006.01)
H04L 25/03 (2006.01)
H04L 1/20 (2006.01)
H04L 1/00 (2006.01)

(52) U.S. Cl.
CPC .......... *H04L 1/205* (2013.01); *H04L 25/03834* (2013.01); *H04L 1/0015* (2013.01); *H04L 1/0003* (2013.01)
USPC ........................................... 370/204; 370/465

(58) Field of Classification Search
USPC ......... 370/203, 204, 208, 216, 254, 310, 431, 370/437, 449, 464, 465, 466, 468
See application file for complete search history.

(56) References Cited

U.S. PATENT DOCUMENTS

| | | | | |
|---|---|---|---|---|
| 6,748,021 | B1 * | 6/2004 | Daly | 375/261 |
| 7,133,456 | B2 * | 11/2006 | Feher | 375/259 |
| 7,623,588 | B2 * | 11/2009 | Park et al. | 375/267 |
| 7,756,003 | B1 * | 7/2010 | Lee et al. | 370/208 |
| 2002/0154705 | A1 * | 10/2002 | Walton et al. | 375/267 |
| 2002/0181407 | A1 * | 12/2002 | Khullar et al. | 370/252 |
| 2003/0003880 | A1 * | 1/2003 | Ling et al. | 455/92 |
| 2004/0208254 | A1 * | 10/2004 | Lee et al. | 375/260 |
| 2006/0072646 | A1 * | 4/2006 | Feher | 375/130 |
| 2007/0098109 | A1 * | 5/2007 | Vadde et al. | 375/297 |
| 2007/0133481 | A1 | 6/2007 | Stanwood et al. | |
| 2008/0002645 | A1 * | 1/2008 | Seki et al. | 370/338 |

OTHER PUBLICATIONS

3RD Generation Partnership Project. 3GPP TS 45.004 V6.0.0 (Jan. 2005). 3rd Generation Partnership Project; Technical Specification Group GSM/EDGE Radio Access Network; Modulation (Release 6). Jan. 2005.
Wu, Y. et al. "Orthogonal Frequency Division Multiplexing: a Multi-Carrier Modulation Scheme." IEEE Transactions on Consumer Electronics, vol. 41, No. 3, Aug. 1995, pp. 392-399.
Chuang, J. et al. "Data Throughput Enhancement in Wireless Packet Systems by Improved Link Adaptation with Application to the EDGE System." IEEE VTC 1999 (Fall), vol. 1, Section II, Sep. 1999, pp. 456-490.

* cited by examiner

*Primary Examiner* — Edan Orgad
*Assistant Examiner* — Curtis A Alia
(74) *Attorney, Agent, or Firm* — Nixon & Vanderhye P.C.

(57) ABSTRACT

A modulation method for data packets transmitted on a mobile communication channel, the method comprising a first linear modulation mode, to be used when the radio conditions are good, and a second constant envelop modulation mode, to be used when the radio conditions are poor. Since a constant envelope-modulated signal is degraded more when time dispersion occurs, the first linear modulation mode is also used when the time dispersion is severe.

11 Claims, 4 Drawing Sheets

ADAPTIVE MODULATION SCHEME FOR MULTIPATH WIRELESS CHANNELS

TECHNICAL FIELD

The present invention relates to a method and an arrangement of modulating data packets in a mobile communication channel.

BACKGROUND

Conventionally, a linear modulation technique is used in the packet-based WCDMA (Wideband Code Division Multiple Access) of the 3G UMTS (Universal Mobile Telecommunication System). In linear modulation, the amplitude of the modulation envelope is directly proportional to the amplitude of the modulated signal at all frequencies, and linear modulation techniques, such as e.g. QPSK (Quadrature Phase-Shift Keying) and 16 QAM (Quadrature Amplitude Modulation) are spectrum efficient and enables a high data rate.

However, a linear modulation requires more costly power amplifiers, since it results in a noise-like signal with a Rayleigh distributed amplitude, having a peak-to-average amplitude ratio, PAR, of about 10 dB, and the power amplifier of the RBS (Radio Base Station) has to be dimensioned to deliver the peak power. Various processing methods are commonly used to limit the PAR, and a typical PAR value after processing is about 7 dB. The radio coverage and the required number of sites is determined by the average transmitted power, and, consequently, a linearly modulated power amplifier has to be dimensioned to handle 7 dB more power than the average transmitted power. Thus, it is expensive to achieve a good coverage, which results in a limited 3G-system coverage, determined by the location of the indoor users.

The time dispersion, or delay spread, of modulation symbols may degrade a received signal, e.g. by intersymbol interference, ISI, where the energy from one symbol spills over into another symbol, and increase the BER (Bit Error Rate). The OFDM (Orthogonal Frequency Division Multiplexing) is a digital linear multi-carrier modulation scheme used in the 3G-LTE (Long Term Evolution), comprising a large number of closely-spaced orthogonal sub-carriers, each sub-carrier modulated with a conventional linear modulation scheme, e.g. QPSK, 16 QAM or 64 QAM, depending on the radio conditions. The OFDM has very long symbols, i.e. ten times longer than the maximum time dispersion, and, consequently, the degradation caused by time dispersion is negligible, requiring no delay equalizer.

On the contrary, a non-linear constant envelope modulation technique, such as e.g. the GMSK (Gaussian Minimum Shift Keying) commonly used in the GSM (the Global System of Mobile communication), has very short symbols, shorter than one tenth of the length of the maximum time dispersion, and a delay equaliser is normally used in order to reduce the time dispersion. The GMSK results in a comparatively low bit-rate, and an increased output power and coverage, with a PAR of 0 dB, but the existence of spectrum emission outside the operating frequency band will lead to poor spectrum efficiency. The GMSK is a type of frequency-shift keying with a continuous phase, and the signal to be modulated is filtered in a Gaussian low-pass filter before being fed to a frequency modulator, thereby reducing the adjacent channel interference.

In order to increase the bit-rate resulting from the GMSK, the conventional GSM/EDGE is adapted to switch to a linear 8 PSK modulation from the constant envelope GMSK modulation, depending on the monitored radio conditions. Since the linear 8 PSK suffers the drawbacks of a lower average output power and a reduced coverage, 8 PSK is only used when the radio conditions are good, otherwise the constant envelope GMSK is maintained.

The packet-based W-CDMA of the 3G uses linear modulation, and handles the time dispersion by a RAKE-receiver, since an equalizer is only applicable at a lower bit-rate. The linear OFDM-modulation of the 3G-LTE, for the future 4G, has a negligible degradation due to time dispersion. However, even though the linear OFDM-modulation of the LTE results in a high bit rate, it has the drawbacks of a limited coverage and a non-efficient use of the power-amplifiers, and the above-described solution of the GSM/EDGE is not applicable, due to the much larger bandwidth of the LTE. Thus, it still presents a problem to achieve an improved coverage and a more efficient use of the power-amplifier in a packet radio communication channel, in particular in a multi-user environment, without increasing the time dispersion degradation.

SUMMARY

The object of the present invention is to address the problem outlined above, and this object and others are achieved by the method and arrangement according to the appended claims.

According to one aspect, the invention provides a method of modulating data packets transmitted on a mobile communication channel. The method comprises a continuous monitoring of a value indicating the radio conditions of the channel, and uses a linear modulation when said monitored radio conditions value exceeds a predetermined radio condition threshold. When the monitored radio conditions value corresponds to, or is lower than, said radio condition threshold, a constant envelope modulation is used, and the time dispersion is monitored regularly and separately. When the monitored time dispersion is determined to be severe by exceeding a predetermined time dispersion threshold, a linear modulation will be selected.

The constant-envelope modulated signal following the power amplifier may be RF-filtered to decrease spurious spectral emission, and the radio conditions and the time dispersion may be monitored by a mobile terminal.

The method may be performed in a multi-user environment, comprising scheduling of a user assigned to constant envelope modulation depending on the determined time dispersion. The scheduling may prioritize a user experiencing a low time dispersion.

According to a second aspect, the invention provides a modulating arrangement for transmitting data packets on a mobile communication channel. The arrangement comprises a linear modulator for a power amplifier and a modulation mode-selecting unit arranged to receive a continuously monitored value indicating the radio conditions of the channel, and to select a modulation mode depending on the received value. Further, the arrangement comprises a constant envelope-modulator for the power amplifier, and said modulation mode-selecting unit is arranged to select a linear modulation mode when said received value indicating the monitored radio condition value exceeds a predetermined radio condition threshold and to select a constant-envelope modulation mode when said received value corresponds to, or is lower than, said threshold. The unit is further arranged to receive a regularly monitored value indicating the time dispersion during constant envelope-modulation, and to switch to a linear modulation mode when the received value exceeds a predetermined time dispersion threshold during the constant envelope-modulation.

The modulating arrangement may further comprise an RF-filter following the power amplifier for removing spurious spectral emission from the constant envelope modulated signal.

Additionally, the linear modulation mode may use OFDM, and the constant envelope modulation mode may use GMSK. Further, the value indicating the radio conditions may correspond to the SIR (Signal-to-Interference Ratio).

BRIEF DESCRIPTION OF THE DRAWINGS

The present invention will now be described in more detail, and with reference to the accompanying drawings, in which.

DETAILED DESCRIPTION

Figure 1:
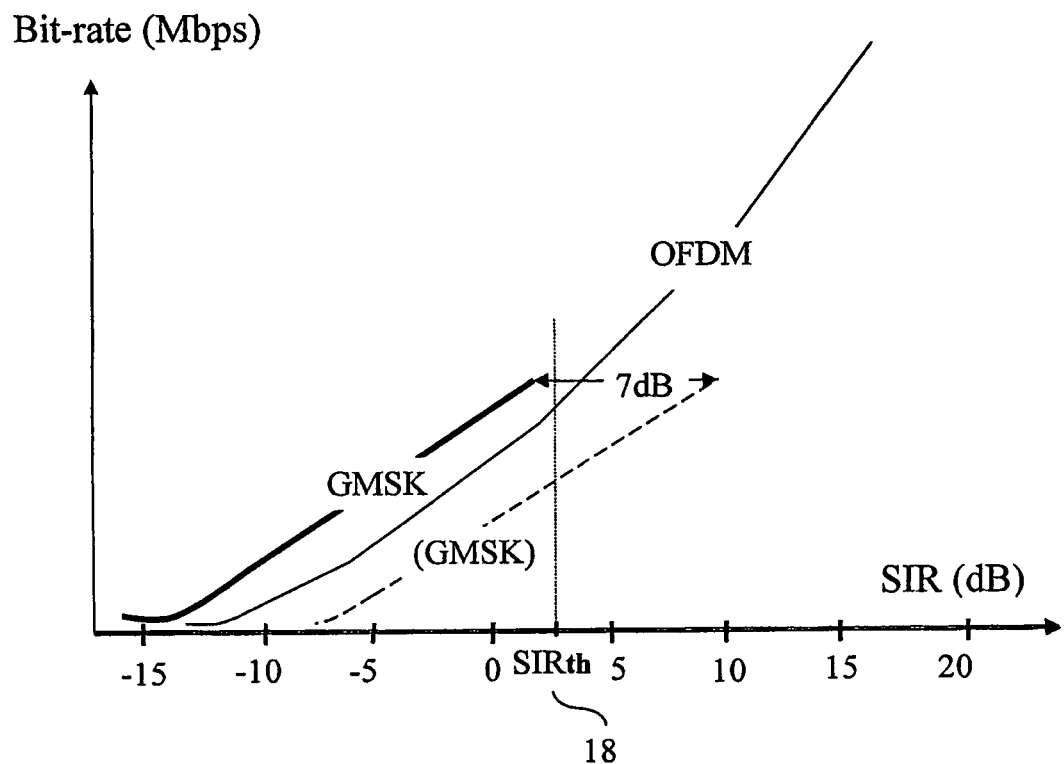
FIG. 1 is a diagram illustrating the radio conditions and the bit-rate of a modulation method according to this invention.

In the following description, specific details are set forth, such as a particular architecture and sequences of steps in order to provide a thorough understanding of the present invention. However, it is apparent to a person skilled in the art that the present invention may be practised in other embodiments that may depart from these specific details.

Moreover, it is apparent that the described functions may be implemented using software functioning in conjunction with a programmed microprocessor or a general purpose computer, and/or using an application-specific integrated circuit. Where the invention is described in the form of a method, the invention may also be embodied in a computer program product, as well as in a system comprising a computer processor and a memory, wherein the memory in encoded with one or more programs that may perform the described functions.

A basic concept of this invention is to add a second constant envelope-modulation mode, in addition to a first linear modulation mode, and switching to the second mode when the radio conditions are bad, in order to use the power amplifier more efficiently and increase the output power. The radio conditions, e.g. the SIR (Signal-to-Interference Ratio) or the SNR (Signal-to-Noise Ratio), are continuously monitored, and the first linear modulation mode is selected when the radio conditions are good, i.e. exceeds a predetermined threshold, and the second constant envelope-modulation mode is selected when the radio conditions are bad, i.e. lower than said threshold.

The first linear modulation mode preferably uses the OFDM, which has a negligible time dispersion degradation, and the second constant envelop modulation mode uses e.g. the GMSK, having a PAR of 0 dB, thus increasing the transmitted average output power with up to 7 dB compared to the linear modulation under a peak power constraint. The increased average power obtained with the GMSK is achieved at the expense of lower peak data bit rate, but since the new modulation mode is only used during bad radio conditions, when a user is located far away from the base station, the user would still receive a very low data bit-rate with the OFDM, far below the peak rate. Therefore, during bad radio conditions, the received bit-rate will in practice be increased by the GMSK, as compared to the bit-rate achieved by OFDM.

However, as explained above, the added second constant envelop GMSK modulation mode is more susceptible to time dispersion than the OFDM modulation, due to the much shorter symbols of the GMSK, compared to the OFDM. Normally, the probability for a severe time dispersion is low, and to use a delay equalizer for reducing the time dispersion degradation, as in the GSM, would require a very high complexity, due to the much larger bandwidth. Therefore, according to the concept of this invention, the resulting time dispersion degradation is reduced by a regular, or continuous, monitoring of the time dispersion during the constant envelope GMSK modulation, and by switching to OFDM modulation when the time dispersion becomes severe, i.e. reaches a predetermined threshold value. In a multi-user environment another user may be scheduled, and a user experiencing a low time dispersion during the GMSK is advantageously prioritized in the scheduling at every moment.

FIG. 1 illustrates an exemplary relationship between the bit rate and the SIR, according to an embodiment of this invention, in which the first linear modulation mode uses the OFDM and the second constant envelope modulation mode uses the GMSK. The SIR in dB is illustrated on the X-axis, the direction of the X-axis indicating a larger SIR, i.e. better radio conditions. The bit-rate is illustrated on the y-axis, and the direction of the y-axis indicates a higher bit-rate. According to this invention, the first linear modulation mode is used when the radio conditions of a user channel is good, i.e. the when the SIR is high, indicated by the OFDM-line in the figure. When the radio conditions on the channel are bad, i.e. the SIR is below a predetermined threshold, SIRth, indicated by 18 in the figure, normally between 0 and 5 dB, then the power amplifier switches to the second constant envelope-mode. The hatched (GMSK)-line in the figure indicates the GMSK bit-rate with the same output power, but since the obtainable OFDM PAR normally is approximately 7 dB, while the GMSK PAR is 0 dB, the transmitted average output power from the same power amplifier is in reality 7 dB higher with GMSK, which is indicated by the GMSK-line in the figure. Consequently, when the radio conditions are bad, i.e. when SIR is low, the bit-rate will in reality increase by a switch to the GMSK-mode, as compared to the conventional OFDM-mode, even though the peak bit-rate is higher on an OFDM-modulated channel than on a GMSK-modulated channel.

Since a GMSK-modulated signal degrades more when time dispersion occurs than an OFDM modulated signal, the time dispersion is monitored separately and regularly during the constant envelope mode, according to this invention. Normally, the time dispersion will be small, and it is a low probability for the occurrence of a severe time dispersion. However, when the time dispersion becomes severe, i.e. exceeds a predetermined time dispersion threshold, hereinafter denoted by TDth, the power amplifier switches from the GMSK back to the OFDM, according to this invention. The interference caused by the time dispersion is hereinafter denoted Itd, and if the time dispersion is severe, the S(ignal)/Itd is lower than SIRth.

Figure 2:
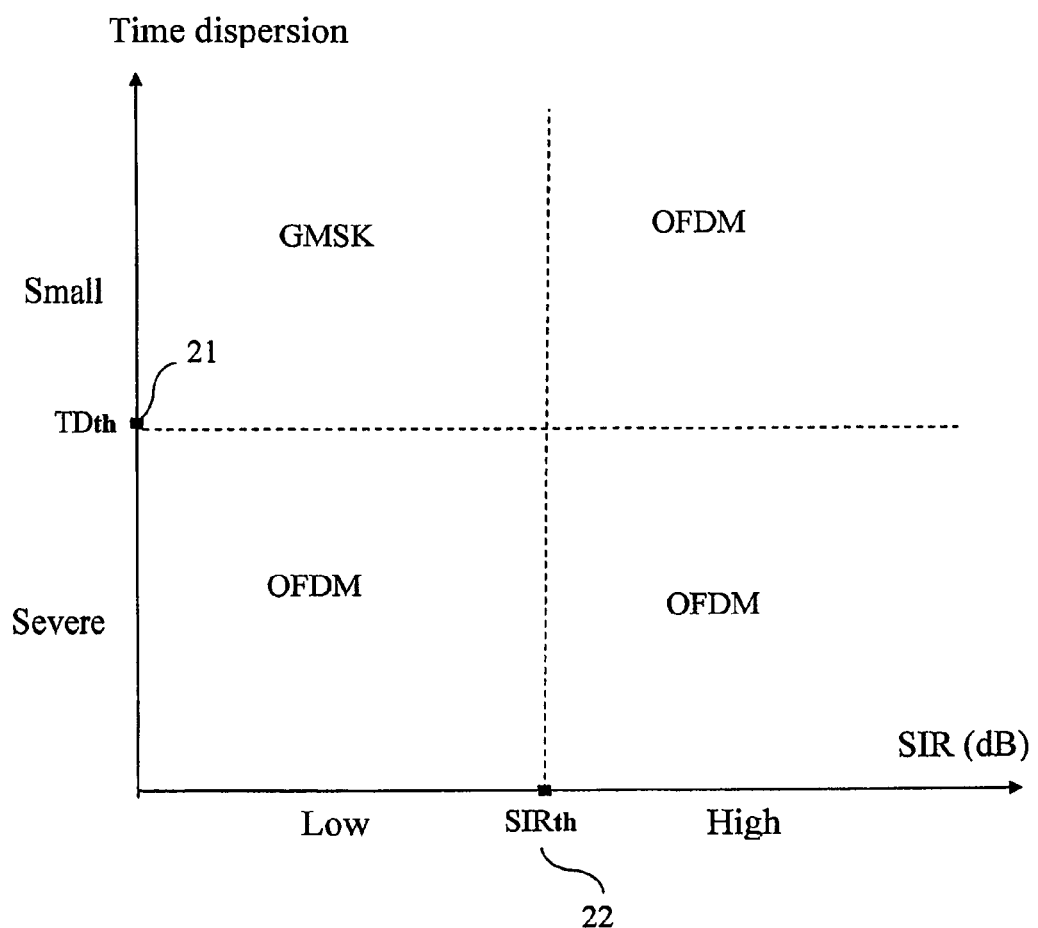
FIG. 2 is a diagram illustrating how the selection between the first and second modulation mode depends on the radio conditions and of the time dispersion.

FIG. 2 illustrates the time dispersion and the SIR, and the selection between the linear OFDM and the constant envelope GMSK, according to this invention. The SIR is illustrated on the X-axis, indicated by Low and High, respectively, with a suitable SIR threshold, SIRth, typically between 0 dB and 5 dB, indicated by the reference numeral 22 in the figure. The time dispersion is illustrated on the Y-axis, indicated by Severe and Small, respectively, with a suitable time dispersion threshold, TDth, indicated by the reference numeral 21 in the figure. Thus, the figure shows that OFDM is always selected if the radio conditions are good, i.e. if the SIR exceeds said predetermined threshold SIRth. When the radio conditions are good and the OFDM is used, the time dispersion is unimportant, since the OFDM is not sensitive to the occurrence of time dispersion, due to the large symbols to the OFDM.

However, when the radio conditions are bad, such that the SIR is lower than said threshold, the GMSK will be used, and the time dispersion will be monitored regularly. The GMSK is used when the SIR is low and the time dispersion is small, but if the interference due to the time dispersion, i.e. Itd, increases and the time dispersion exceeds the predetermined time dispersion threshold, TDth, then OFDM will be used, and another user may advantageously be scheduled in a multi-user environment.

Figure 3:
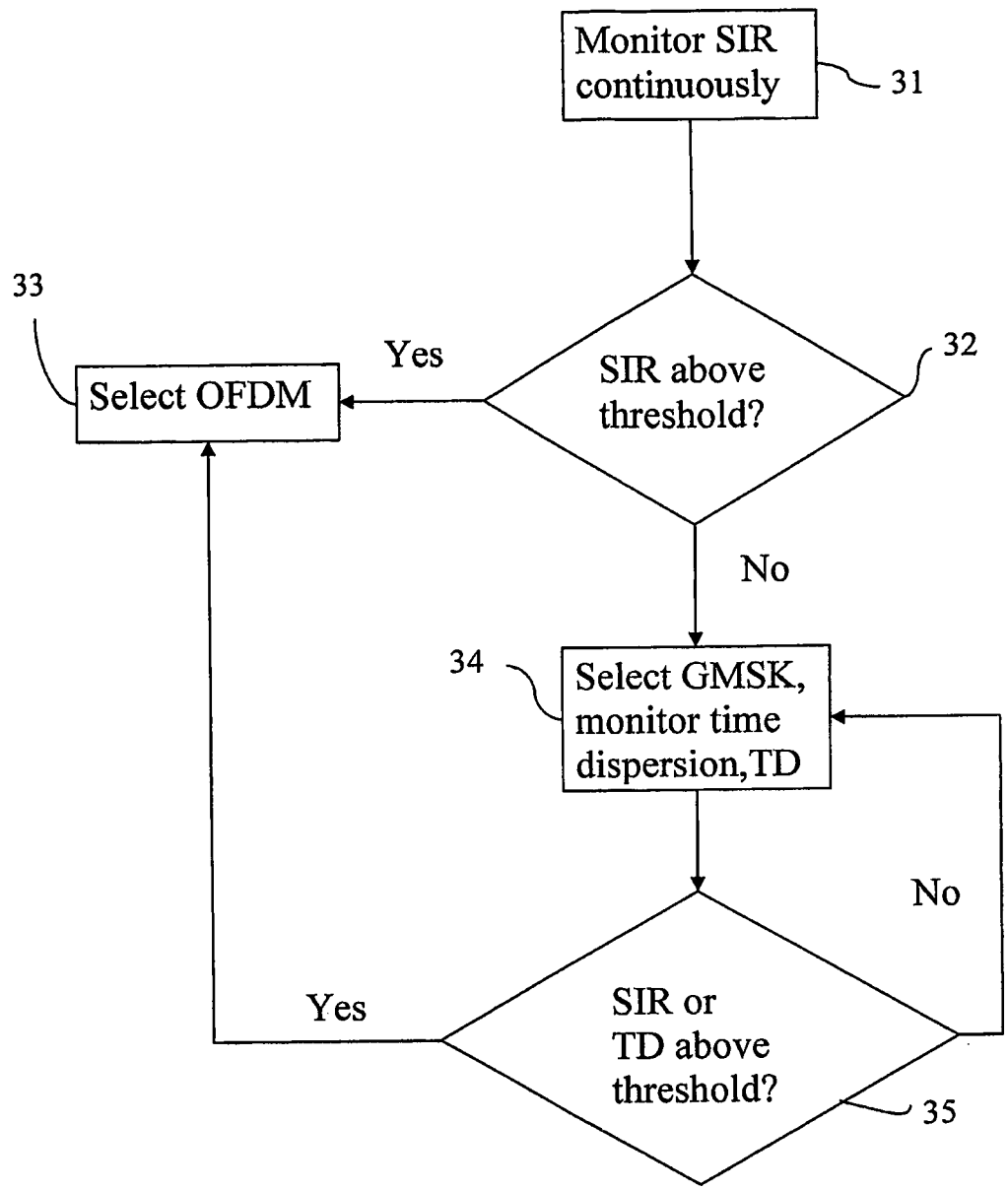
FIG. 3 is a flow diagram illustrating an exemplary embodiment of the modulation method, according to this invention.

FIG. 3 is a flow chart illustrating an exemplary embodiment of this invention, in which the linear modulation mode uses the OFDM and the constant envelope mode uses the GMSK. According to this invention, the radio conditions are continuously monitored, in step 31, and in step 32 it is determined if the SIR, i.e. the parameter indicating the radio conditions, is above or below the predetermined threshold, SIRth. If SIR exceeds said threshold, the linear OFDM-modulation is used, in step 33, otherwise the power amplifier is switched to the constant envelope GMSK-modulation, in step 34, and the time dispersion is monitored separately and regularly. If it is determined, in step 35, that the time dispersion is severe, i.e. exceeds a predetermined time dispersion threshold, TDth, or that the continuously monitored radio conditions have improved and are exceeding said SIR threshold, SIRth, then the OFDM is selected, in step 33, otherwise GMSK will still be used.

Additionally, since a drawback with the constant envelop modulation is the lower spectrum efficiency, which results in an increased spurious spectral emission, an improved RF filtering is applied, according to a further embodiment of this invention. However, the RF-filtering is only applied on the constant-envelope modulated signal, and the linearly modulated signal will not be affected or degraded at all.

The second constant envelope modulation mode, according to this invention, is also advantageous if the supplied DC power or the power loss dissipation is the limiting factor, since a power amplifier requires a lower level of supplied DC power for the same output power using constant envelope modulation, as compared to a linear modulation. Additionally, the efficiency is larger, typically 60% using constant envelope modulation, as compared to typically 25% for a linear modulation power amplifier.

Therefore, according to this invention, the average output power on a packet radio channel in a cellular system can be considerably increased under any type of power constraint, such as e.g. the peak power, the supplied DC power or the dissipated power.

Figure 4:
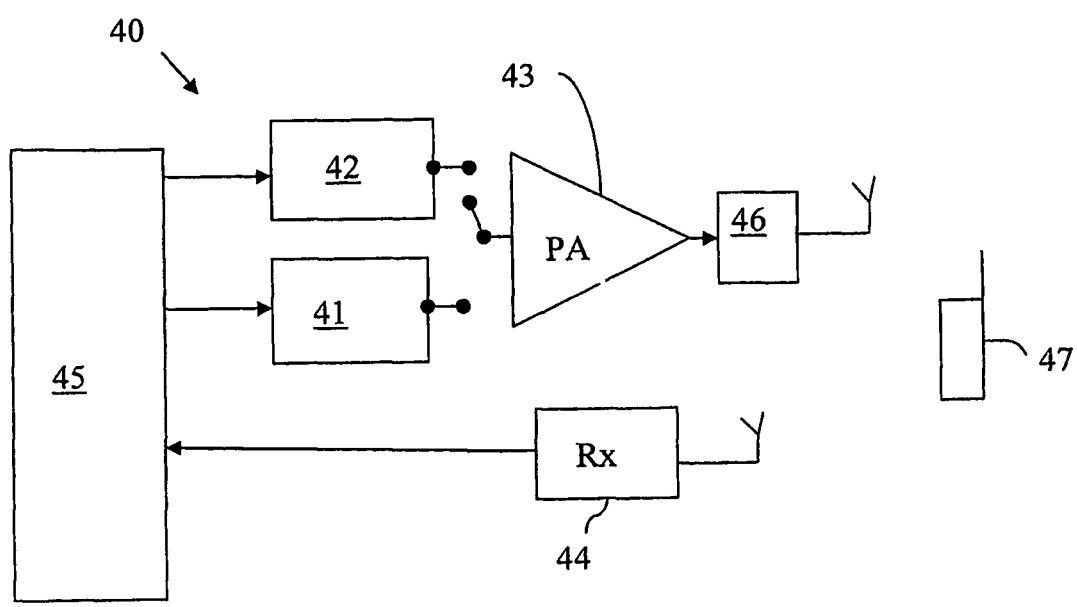
FIG. 4 is a block diagram schematically illustrating an exemplary modulation arrangement, according to this invention.

FIG. 4 is a block diagram illustrating an exemplary embodiment of the modulation arrangement according to this invention. The power amplifier is indicated by 43, which is driven by a linear modulator 41 or by a constant envelope-modulator 42. The selection between the linear and the constant envelope modulator is controlled by a modulation mode-selecting unit 45, according to this invention. The radio conditions and the time dispersion are typically monitored by the conventional monitoring functions of a mobile terminal 47, and suitable values indicating the radio conditions, e.g. the SIR, as well as the time dispersion, are forwarded to the modulation mode-selecting unit 45 via the radio channel and the receiver 44. This modulation mode selecting unit compares the received value of the SIR with the predetermined threshold SIRth, and selects the appropriate mode. Additionally, during the constant envelop mode, the mode-selecting unit compares the received time dispersion value with the predetermined threshold TDth, and switches back to the linear mode when a severe time dispersion occurs, or when the radio conditions have improved. Further, a suitable RF-filter 46 is required for the constant envelop modulated signal due to the occurrence of spurious spectral emission, the RF-filter having a bandwidth corresponding to the modulation bandwidth.

In the conventional OFDM, the radio conditions are normally monitored as well, and a different modulation method is selected depending on the radio conditions. FIG. 1 illustrates an exemplary embodiment of this invention, using the OFDM in the first linear modulation mode. The SIRth, denoted by the reference numeral 18, indicates the radio condition threshold for switching to the second constant envelope modulation mode, and, as described above, an exemplary SIRth is typically between 0 dB and 5 dB. However, according to the conventional OFDM, different modulation modes are applied for SIR-values above this threshold SIRth, depending on the radio conditions, such as QPSK-modulation for a comparatively low SIR, 16 QAM-modulation for a good SIR, and 64 QAM-modulation for an excellent SIR.

While the invention has been described with reference to specific exemplary embodiments, the description is in general only intended to illustrate the inventive concept and should not be taken as limiting the scope of the invention.

The invention claimed is:

1. A method of modulating data packets transmitted on a mobile communication channel, the method comprising the steps of:
   continuously monitoring a value indicating a radio condition of the mobile communication channel;
   using a linear OFDM (Orthogonal Frequency Division Multiplexing) modulation scheme when said monitored radio condition value exceeds a predetermined radio condition threshold;
   selecting a constant envelope modulation when said monitored radio condition value corresponds to, or is lower than, said radio condition threshold, and regularly monitoring time dispersion separately from monitoring the radio condition value when the constant envelope modulation is selected; and
   selecting the linear OFDM modulation scheme when the monitored time dispersion is determined to be severe by exceeding a predetermined time dispersion threshold.

2. The method of claim 1, wherein the linear OFDM modulation scheme and the constant envelope modulation is for driving a power amplifier, the method further comprising RF-filtering of the constant-envelope modulated signal following the power amplifier to decrease spurious spectral emission.

3. The method of claim 1, wherein the radio condition and the time dispersion are monitored by a mobile terminal.

4. The method of claim 1, wherein the constant envelope modulation uses GMSK.

5. The method of claim 1, wherein the method is performed in a multi-user environment, and further comprises scheduling of a user assigned to constant envelope modulation depending on the monitored time dispersion.

6. The method of claim 5, wherein said scheduling prioritizes a user experiencing a low time dispersion.

7. The method of claim 1, wherein the value indicating the radio conditions corresponds to a Signal-to-Interference Ratio (SIR).

8. A modulating arrangement for transmitting data packets on a mobile communication channel, the arrangement comprising:
- a linear modulator for a power amplifier, the linear modulator arranged to use an OFDM (Orthogonal Frequency Division Multiplex)-modulation scheme;
- modulation mode-selecting circuitry arranged to receive a continuously monitored value indicating radio conditions of the mobile communication channel, and to select a modulation mode depending on the received value; and
- a constant envelope-modulator for the power amplifier;
- said modulation mode-selecting circuitry arranged to select a linear OFDM modulation mode when said received radio condition value exceeds a predetermined threshold, and to select a constant-envelope modulation when said received radio condition value corresponds to, or is lower than, said threshold; and
- said modulation mode-selecting circuitry further arranged to receive a regularly monitored value indicating a time dispersion during constant envelope-modulation, and to switch to the linear OFDM modulation mode when the received value indicating the time dispersion exceeds a predetermined time dispersion threshold during constant envelope-modulation.

9. The modulating arrangement of claim 8, wherein the arrangement further comprises an RF-filter following the power amplifier for removing spurious spectral emission from the constant envelope modulated signal.

10. The modulating arrangement of claim 8, wherein the constant envelope modulator uses GMSK-modulation.

11. The modulating arrangement of claim 8, wherein the value indicating the radio conditions corresponds to a Signal-to-Interference Ratio (SIR).

* * * * *

UNITED STATES PATENT AND TRADEMARK OFFICE
CERTIFICATE OF CORRECTION

PATENT NO. : 8,902,725 B2  
APPLICATION NO. : 12/667341  
DATED : December 2, 2014  
INVENTOR(S) : Stolt et al.

Page 1 of 1

It is certified that error appears in the above-identified patent and that said Letters Patent is hereby corrected as shown below:

In the Claims

Column 6, line 50 (claim 1, line 13), delete "time" and insert -- a time --, therefor.

Signed and Sealed this
Thirtieth Day of June, 2015

Michelle K. Lee
*Director of the United States Patent and Trademark Office*